United States Patent [19]

Skavnak et al.

[11] Patent Number: 5,234,179
[45] Date of Patent: Aug. 10, 1993

[54] VIDEOTAPE ADAPTOR FOR USE WITH A CARTRIDGE

[75] Inventors: James E. Skavnak; John F. Kaman, both of Minneapolis; Thomas A. Turgeon, Fridley, all of Minn.; Jerrold K. Weeks, Hudson, Wis.

[73] Assignee: Minnesota Mining and Manufacturing Company, St. Paul, Minn.

[21] Appl. No.: 814,260

[22] Filed: Dec. 23, 1991

Related U.S. Application Data

[63] Continuation of Ser. No. 481,986, Feb. 20, 1990, abandoned.

[51] Int. Cl.$^5$ .................. G11B 23/087; B65H 18/12
[52] U.S. Cl. .................................. 242/200; 242/199
[58] Field of Search .......................... 242/198–200, 242/179; 360/94, 132

[56] References Cited

U.S. PATENT DOCUMENTS

| | | | |
|---|---|---|---|
| 30,232 | 3/1880 | Wright | 242/200 |
| 2,275,497 | 3/1942 | Berndt | 242/200 |
| 3,653,608 | 4/1972 | Dickens et al. | 242/199 |
| 3,672,603 | 6/1972 | Swain | 242/194 |
| 3,800,321 | 3/1974 | Bolick, Jr. | 360/94 |
| 4,019,695 | 4/1977 | Wharam | 242/199 |
| 4,196,873 | 4/1980 | Kudoh | 242/195 |
| 4,432,508 | 2/1984 | Inoue et al. | 242/195 |
| 4,470,560 | 9/1984 | Yoneya et al. | 360/94 |
| 4,479,618 | 10/1984 | Okada et al. | 242/200 |
| 4,527,755 | 7/1985 | Rood et al. | 242/199 |
| 4,544,970 | 10/1985 | Ogata | 360/94 |
| 4,558,384 | 12/1985 | Umeda | 360/94 |
| 4,566,048 | 1/1986 | Tokunaga | 242/200 |
| 4,572,460 | 2/1986 | Hertrich | 242/195 |
| 4,577,811 | 3/1986 | Bray et al. | 242/195 |
| 4,920,436 | 4/1990 | Novak | 360/132 |
| 5,031,065 | 7/1991 | Flor et al. | 360/132 |
| 5,034,842 | 7/1991 | Turgeon | 360/132 |
| 5,099,378 | 3/1992 | Turgeon | 360/132 |

FOREIGN PATENT DOCUMENTS

| | | |
|---|---|---|
| 0201156 | 2/1986 | European Pat. Off. . |
| 0395238 | 4/1990 | European Pat. Off. . |
| 58-211375 | 8/1983 | Japan ........................ 360/94 |
| 2162150A | 1/1986 | United Kingdom . |
| 2217684A | 11/1989 | United Kingdom . |

*Primary Examiner*—Daniel P. Stodola
*Assistant Examiner*—John Q. Nguyen
*Attorney, Agent, or Firm*—Merchant, Gould, Smith, Edell, Welter & Schmidt

[57] ABSTRACT

An adaptor for using a tape cartridge in a standard VHS videotape machine. The adaptor includes a thumb operated winder and a take up reel. The take up reel includes a clutch to minimize drag on the winder.

7 Claims, 5 Drawing Sheets

VIDEOTAPE ADAPTOR FOR USE WITH A CARTRIDGE

This is a continuation of U.S. application Ser. No. 07481,986, filed Feb. 20, 1990, now abandoned.

FIELD OF THE INVENTION

The present invention relates to magnetic tape cartridges and adaptors for use in videotape machines. More particularly the invention relates to an adaptor which adapts a specialized video-cartridge to the VHS standard videocassette format.

DESCRIPTION OF THE PRIOR ART

Most home videotape machines use magnetic recording media supplied in a videocassette format. The typical videocassette contains both a supply reel and a take-up reel. The inclusion of the empty take-up reel within the videocassette housing makes this format inefficient for tape storage.

The storage of videotape on a single supply reel tape cartridge is an attractive alternative to the videocassette. The prior art teaches the use of a single supply reel videocartridge for use with an adaptor in British Patent Application GB 2,162, 150A published Jan. 26, 1986.

In use, the prior art tape cartridge is assembled into the adaptor to construct an assembly which forms a conventionally sized videocassette. However, this prior art system exhibits a number of problems which must be addressed to produce a commercially useful video-cartridge product.

For example, the tape in the cartridge must be connected to a take-up reel located in the adaptor. In this prior art system, a message cartridge is placed into a modified cassette and a tape leader is drawn out of the cartridge by hand and attached at the take-up spool.

SUMMARY OF THE INVENTION

In contrast to the prior art, the adaptor of the present invention automatically connects the tape in the cartridge to the take-up reel in the adaptor.

The videotape adaptor includes mechanisms which cooperate with the inserted cartridge to automatically interconnect the tape on the supply reel in the cartridge with the take-up reel located in the adaptor. In operation, the insertion of the cartridge into the adaptor mechanically interconnects a tape connector with a tether connector forming an interconnection.

The adaptor of the present invention includes a novel winding mechanism in combination with a novel take-up reel.

The winding mechanism is provided to advance the interconnection from the supply reel, to the take-up reel. This operation must be completed prior to insertion of the adaptor into the videotape machine.

At the conclusion of play within the videotape machine, the winder mechanism is also used to rewind the interconnection to the supply reel side of the adaptor.

In addition, the adaptor contains a novel take-up reel with a clutch mechanism to reduce rewind drag. The clutch is disengaged during the manual advance and rewind operations.

BRIEF DESCRIPTION OF THE DRAWING

In the drawing, in which like reference numerals indicate corresponding structures throughout the views.

DETAILED DESCRIPTION OF THE PREFERRED EMBODIMENT

In the following detailed description of the preferred embodiment, reference is made to an illustrative embodiment of the invention. It is to be understood that other embodiments may be utilized without departing from the scope of the present invention.

U.S. patent application Ser. No. 07/343,851 filed Apr. 26, 1989; U.S. patent application Ser. No. 07/353,826 filed May 18, 1989; U.S. patent application Ser. No. 07/398,068 filed Aug. 24, 1989; U.S. patent application Ser. No. 07/398,069 filed Aug. 24, 1989; U.S. patent application Ser. No. 07/381,159 filed Jul. 17, 1989; and U.S. patent application Ser. No. 07/482,071 filed Feb. 20, 1990; relate to the tape cartridge and adaptor technology described herein. Each of these applications is incorporated by reference.

Figure 1:
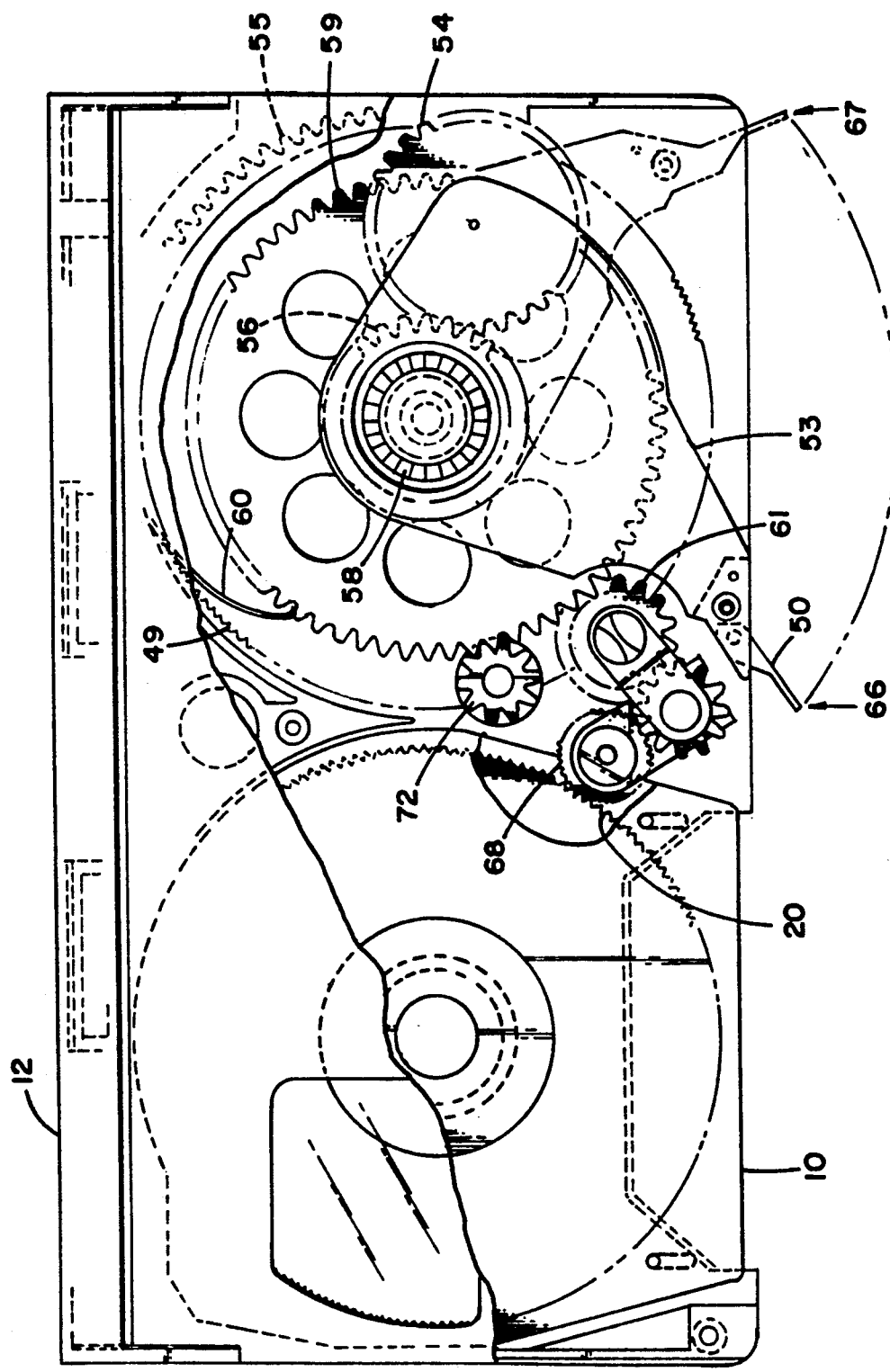
FIG. 1 is a top view of the adaptor showing the gear train in phantom view.
Figure 2:
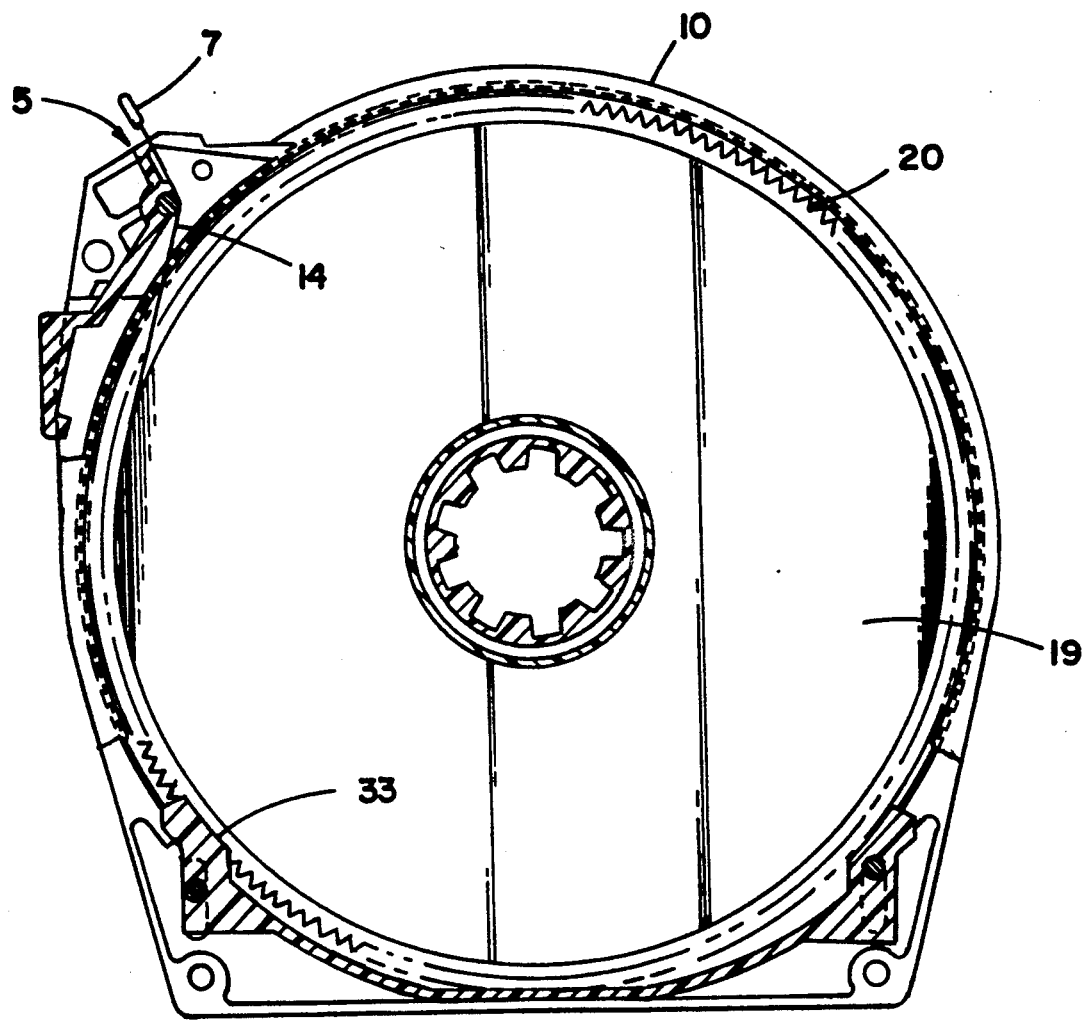
FIG. 2 is a top view of a cartridge suitable for use with the adaptor.
Figure 3:
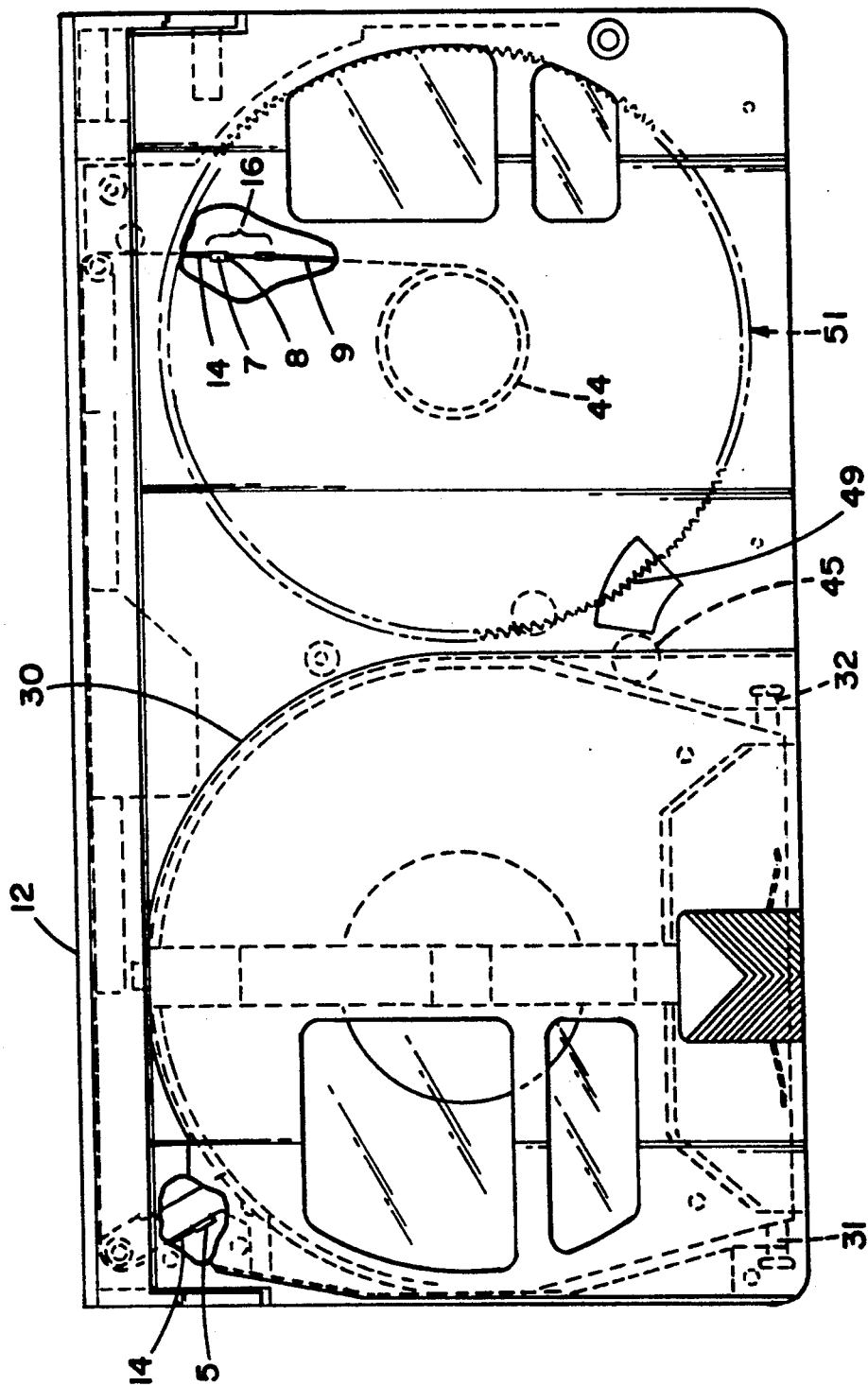
FIG. 3 is a top view of the cartridge inserted into the adaptor with the adaptor door in the closed position.

In general terms, and with reference to FIG. 1., the user inserts the video cartridge 10, into the adaptor 12. The cartridge 10 is shown in isolation in FIG. 2. The cartridge 10 is inserted into the adaptor 12 by opening the door 30 of the adaptor 12 and placing the cartridge 10 into a door pocket. Once the cartridge is seated in the door pocket, the door 30 is rotated from a first "open" position to a second "closed" position. FIG. 1 and FIG. 3 depict the door in the closed position. The door 30 pivots about an axis formed by hinge axle 31 and 32, as shown in FIG. 3.

The door closure operation performs a number of separate actions. Door closure seats the cartridge in the adaptor which releases a ratchet brake mechanism, shown generally in FIG. 2 as 33. Release of the ratchet brake mechanism permits the supply reel to rotate within the cartridge housing.

Door closure also makes the connection between a tape connector 7, and a tether connector 8. This union is called the interconnection and it is depicted as 16 in FIG. 3. The tape connector 7 is attached to a leader which is attached to the tape 14 stored on the supply reel 19. The tether connector 8 is connected to a tether 9 which, in turn, is attached to the take up hub 44 of the take-up reel 51. The completion of the tape-tether interconnection operates an interlock which releases the tape-tether interconnector at the cartridge at the position labeled 5. At this point the tape is free to move in the "play" direction.

The tape-tether interconnection 16 must be transferred to the take up reel 51 before the adaptor 12 is inserted into the video tape machine to prevent damage to the tape heads of the videotape machine.

A manually operated winding mechanism disclosed herein, is provided to permit the operator to advance the tape-tather interconnection 16 in the play direction, onto the take up reel. This process moves the tape-tether interconnection from a "home position" in a corner 5 of the cartridge to a "ready-run" where the interconnection is wound onto the take-up reel. This event prepares the adaptor for insertion into the videotape machine.

At the conclusion of play, the adaptor is removed from the videocassette machine at the end of the rewind cycle. The rewind cycle leaves the interconnection on the take-up side of the adaptor in the "ready-run position". The user then operates the manually operated winder to return the tape-tether interconnection 16 to the "home position" 5. Once the interconnection is in the home position, the user may rotate the door into the open position and remove the cartridge from the adaptor.

The winding mechanism is displayed in phantom view in FIG. 1. Power is applied to the winder by actuation of the thumb lever 50 which may be moved in an arcuate path, pivoting about the axis of the take up reel 51.

As previously described the winder can move the tape in either the "play" direction or the "rewind" direction. Movement in the "play" direction is accomplished by applying force to the lower gear tooth flange 49 of the take up reel 51. Movement in the "rewind" direction is accomplished by applying force to the gear tooth flange 20 of the supply reel 19. Both of these gear tooth flanges are located on the bottom of their respective reels.

The gear train which selectively transfers power from the thumb lever to the appropriate gear flange includes a number of mechanical elements. With reference to the exploded perspective view of FIG. 5, and the plan view of FIG. 1, a planetary gear set 48 is driven by the thumb lever 50. Power is transferred out of the planetary gear set through the sun gear 56. The sun gear is concentric with, and attached to a spur gear 59 through a ratchet assembly 47. Power is taken from the spur gear 59 through an idler gear 61 which delivers power to a transfer gear set 62 which drives a clapper gear 68. The clapper gear is a switch gear which may selectively engage either the take up reel gear flange 49 (FIG. 3) or the supply reel gear flange 20 (FIG. 2).

In greater detail and with reference to FIG. 1 the thumb lever 50 is attached to a planet gear carrier 53. A single planet gear 54 is mounted for rotation on the carrier 53 and engages a fixed, toothed sector gear segment 55 and a sun gear 56. The planet gear carrier 53 is pivotally mounted concentric with the sun gear 56 and is free to rotate in a arcuate path from a first "retracted" position 66 to a second "extended" position 67. A constant force spring 57 (FIG. 5) is provided to return the lever from the extended position to the retracted position. Rotary motion imparted to the sun gear 56 by the thumb lever is transferred through a ring of ratchet teeth 58 to a spur gear 59. The spur gear 59 engages a pawl 60 (FIG. 1) to prevent reverse rotation of the spur 59 as the lever 50 is retracted by the constant force spring 57. This pawl 60 cooperates with the ratchet assembly 47 to convert the lever motion into a rotary motion and to permit multiple strokes of the lever 50 to be accumulated to move the tape 14.

The gear ratios are selected to provide approximately one reel rotation per lever stroke and approximately 4 lever strokes are required to advance the tape tether interconnection 16 from the home position 5 to the "ready-run". Preferably, the selected reel will rotate one revolution for each stroke of the winder.

Figure 5:
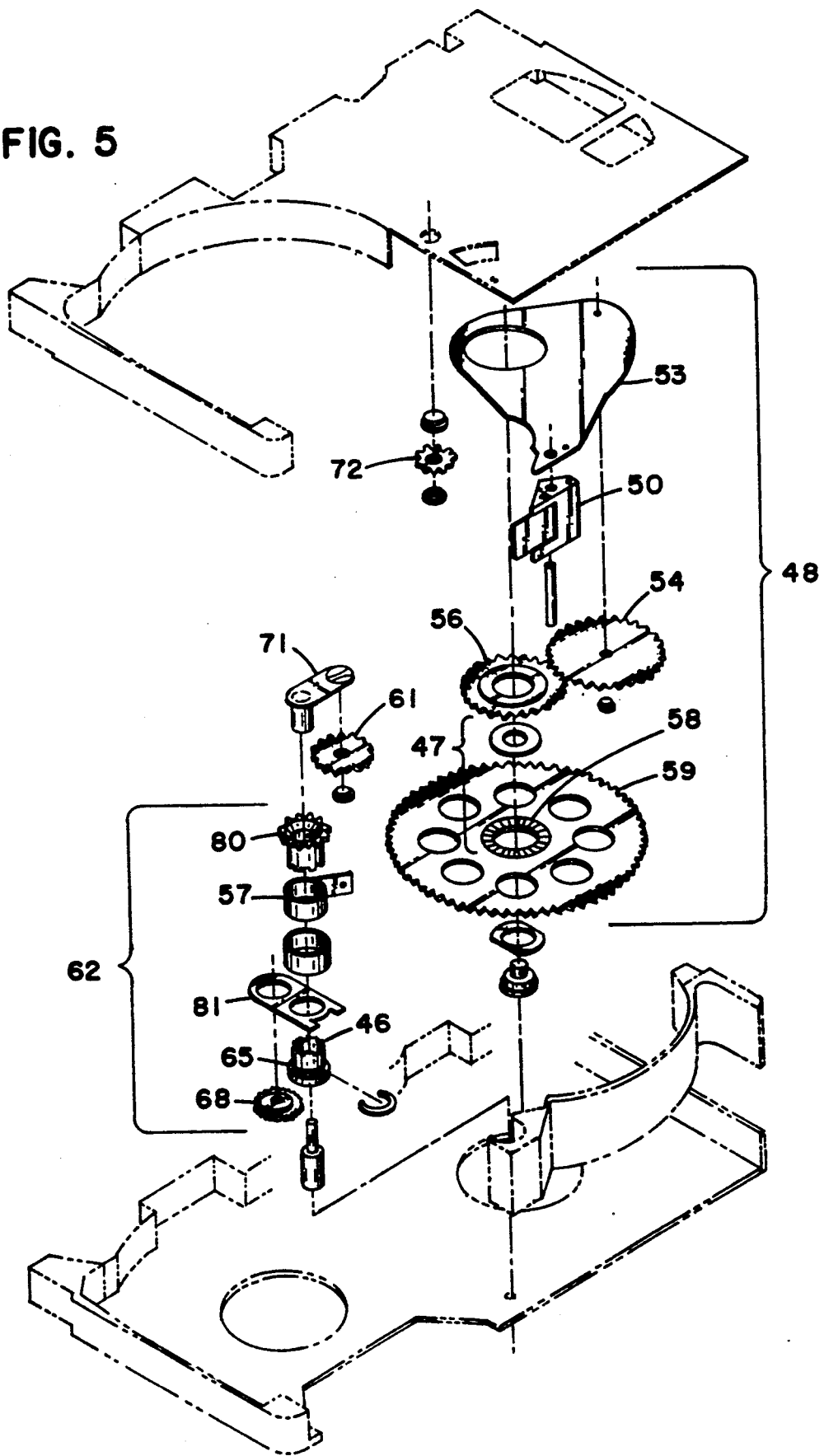
FIG. 5 is an exploded view of the winder gear train assembly.

The idler gear 61 couples motion from the spur gear 59 to the transfer gear assembly 62 (FIG. 5). The transfer gear assembly serves to transfer power from the upper portion of the adaptor to the lower portion of the adaptor. The output transfer gear 65 engages and drives the clapper gear 68. The clapper gear is mounted to a pivoting arm 81 which may be moved selectively, from engagement with the take up reel lower flange 49, to engagement with the supply reel lower flange gear 20. In operation the arm 81 rotates as a reaction to the rotational input to the input transfer gear 80. The clapper gear is dragged into position by frictional engagement with the transfer gear assembly made up of gears 80 and 65. Thus, the direction of rotation of the transfer gears selects which of the two reels is engaged by the clapper gear 68.

In FIG. 1 the idler gear 61 is shown in direct engagement with the spur gear 59. Reverse rotation of the transfer gear assembly is required for rewind action. For reverse or rewind rotation the lower gear flange 20 of the supply reel 19, is driven by the winding mechanism. To change the direction of rotation the idler gear 61 is mounted on a rocker 71 which pivots about the axis of transfer gear assembly 62. Manual movement of the rocker 71 moves the idler gear 61 into engagement with a small reversing gear 72 which changes the direction of rotation of the idler gear 61.

The elements of the transfer gear assembly 62 are shown in FIG. 5. Power is supplied to the transfer gear assembly from the idler gear 61. This gear engages the input transfer gear 80. This input transfer gear 80 is attached the output transfer gear 65 through a mating structure shown in FIG. 5 as a square tooth spline 46.

The clapper gear 68 is mounted on an arm 81 which is adapted for pivotal motion around the axis of the transfer gear assembly. Rotation about this pivot will cause the clapper gear to engage either the supply reel gear flange 20 or the take up reel gear flange 49. The arm rotates into engagement with the selected gear flange through the rotation of the arm 81.

In operation, the user may advance or rewind tape through the thumb operated clapper gear. However once the adaptor has been inserted into the videotape machine the tape transport will insert a pin into the aperture 45 formed in the adaptor as seen in FIG. 3. The pin, which is not shown contacts the conical interior surface of the clapper gear 68 which centers it within the housing, and thus disengages it from either of the reel gear flanges.

It is important to reduce gear train drag wherever possible to improve the acceptability of the adaptor. A significant reduction in drag is achieved in the present design by de-coupling the take up reel drive spline 38 from the take up reel hub 44 under certain operating conditions. It is preferred to have the drive spline de-coupled while the adaptor winder is being used. This result is achieved through the use of a specialized dog clutch.

Figure 4:
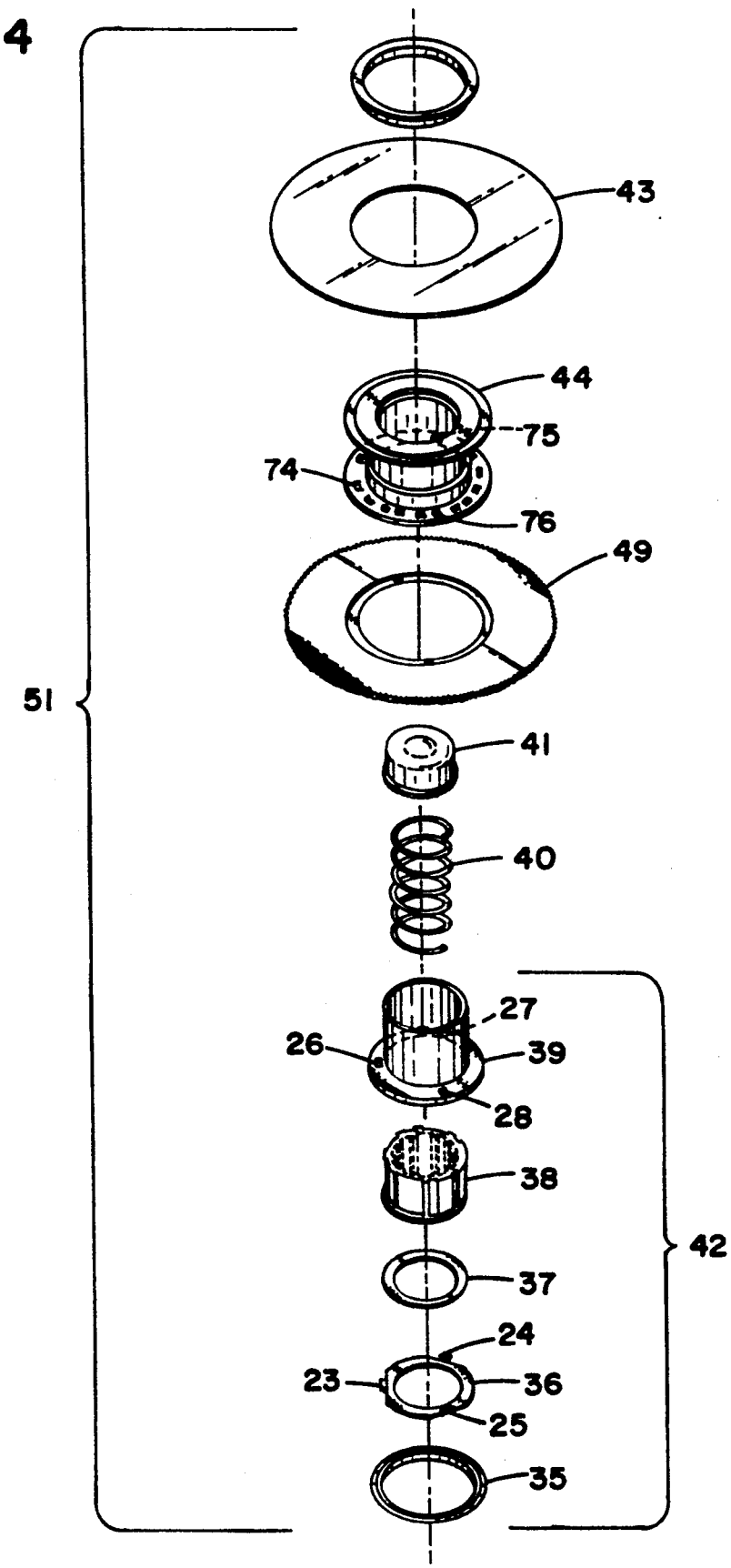
FIG. 4 is an exploded view of the take-up reel assembly.

In general terms, and with reference to FIG. 4, the take up reel 51 is made up of an upper 43 and lower gear flange 49 which are bonded to the hub take up hub 44. These three elements form a unitary spool for receiving and storing tape. The take up reel 51 is driven by the videotape machine through a drive hub assembly 42. In operation, the video tape machine introduces a drive spindle into the spline hub 38 to rotate the take-up reel.

The splined hub 38 is connected to the dog hub 39 and forms a unitary structure with the dog hub 39. The dog ring 36 is forced away from the dog hub 39 by a spring washer 37. Flange surfaces on the ends of the dogs 23-25 of the dog ring 36 cooperate with the retainer ring 35 to retain the dog ring 36 in alignment with the holes 26-28 of the dog hub 39. In operation, rotary motion supplied to the spline hub 38 is imparted to the take-up hub 44 if the dogs 23-24 inserted into and engage the holes 26-28 spaced around the outer edge of the dog hub 39. Typically, this condition will occur when the adaptor is in the videotape machine and the videotape machine drive spindle has entered the splined hub 38 and compressed the spring washer 37. Typically when the adaptor is out of the videotape machine the spring washer 37 urges the dogs out of engagement with the drive holes 74-76 of the take-up hub 44 and thus disengages the clutch, permitting free rotation of the take-up reel by the winder mechanisms.

This illustrative embodiment of the invention provides a convenient and effective method of preparing the adaptor for insertion into a videocassette machine.

What is claimed is:

1. An adaptor, for use with a tape cartridge of the type having a supply reel and having a supply reel gear flange on said supply reel for rotating said supply reel, comprising:
   a housing adapted to receive said tape cartridge;
   a take-up reel located in said housing, adapted for rotation within said housing;
      said take-up reel, located in said housing having a take-up reel gear flange for rotating said take-up reel;
   gear train means located in said housing, for selectively coupling power to said supply reel gear flange and to said take-up reel gear flange;
   manually operated lever means extendable from said housing coupled to said gear train means for manually supplying power to said gear train means to selectively wind said take-up reel and to selectively rewind said supply reel, said manually operated lever means pivotally mounted in said housing for reciprocating arcuate motion between a first position and a second position.

2. The adaptor of claim 1 wherein said gear train means comprises:
   ratchet means located in said housing coupled to said lever means for converting reciprocating, substantially arcuate lever means motion into rotary motion;
   gear means located in said housing coupled to said ratchet means for transferring said rotary motion to a clapper gear;
      said gear means including selection means for transferring power to clapper gear means to direct power to either said take-up reel or said supply reel;
   said clapper gear mounted for pivotal motion, coupled to said gear means for selectively engaging said supply reel for transferring power to rewind said supply reel and for selectively engaging said take-up reel for transferring power to wind said take-up reel.

3. The adaptor of claim 1 wherein said gear train means comprises:
   planetary gearset means coupled to said manually operated lever means for converting reciprocating motion of said lever means to a rotary motion;
   transfer gear means coupled to said planetary gearset means for transferring said rotary motion to said supply reel or to said take-up reel, to selectively wind said take-up reel and to selectively rewind said supply reel.

4. An adaptor, for use with a tape cartridge for storing tape, said tape cartridge of the type having a supply reel, said supply reel having a gear flange for rotating said supply reel, said cartridge having a tape connector, connected to said tape, adapted for mating engagement with a tether connector, said adaptor comprising:
   a housing, defining a cartridge receiving aperture for receiving said tape cartridge;
   a take-up reel located in said housing, adapted for rotation within said housing;
      said take-up reel, having a gear flange for rotating said take-up reel;
   tether means for guiding said tape, said tether means having a first end and a second end;
      said tether means located in said housing, extending from said cartridge receiving aperture to said take-up reel;
      said first end of said tether means being connected to said take-up reel;
      said second end of said tether means, attached to said tether connector, and retained proximate said cartridge reception aperture for engagement with said tape connector;
   gear train means located in said housing, for selectively coupling power to said supply reel and to said take-up reel;
   manually operated lever means located in said housing coupled to said gear train means for manually supplying power to selectively wind said take up reel or to selectively rewind said supply reel, said manually operated lever means pivotally mounted in said housing for reciprocating arcuate motion between a first position and a second position.

5. The adaptor of claim 4 wherein said gear train means comprises:
   ratchet means located in said housing coupled to said lever means for converting reciprocating lever means motion into rotary motion;
   transfer gear means located in said housing coupled to said ratchet means for transferring said rotary motion to a clapper gear;
      said transfer gear means including selection means for selectively directing power to either said take-up reel of said supply reel;
   said clapper gear mounted for pivotal motion, coupled to said selection means for selectively transferring power to rewind said supply reel and for selectively transferring power to wind said take-up reel.

6. The adaptor of claim 4 wherein said gear train means comprises:
   planetary gearset means coupled to said lever means for converting reciprocating motion of said lever means to a rotary motion;
   transfer gear means coupled to said planetary gearset means for selectively transferring said rotary motion to said supply reel and to said take-up reel, to selectively wind said take up reel and to selectively rewind said supply reel.

7. The adaptor of claim 6 wherein said planetary gearset means comprises:
   a planet gear mounted on said lever means, for receiving power;

sector gear segment fixed in said housing, for converting reciprocating motion of said lever means into rotational motion of said planet gear;

a sun gear engaging said planet gear for driving a ratchet means;

said ratchet means for converting oscillating motion into rotary motion;

spur gear means, coupled to said ratchet means for transferring rotary motion to idler gear means;

said idler gear means coupled to said spur gear, for delivering rotational motion to said transfer gear means.

* * * * *

UNITED STATES PATENT AND TRADEMARK OFFICE
CERTIFICATE OF CORRECTION

PATENT NO. : 5,234,179
DATED : August 10, 1993
INVENTOR(S) : James E. Skavnak et al.

It is certified that error appears in the above-indentified patent and that said Letters Patent is hereby corrected as shown below:

In column 1, line 6, please delete "07481,986" and insert therefor --07/481,986--

In column 2, line 1, please delete the word "DRAWING" and insert therefor --DRAWINGS--

In column 2, line 3, please delete the word "drawing" and insert therefor --drawings--

In column 3, line 1, please delete "tape-tather" and insert therefor --tape-tether--

In column 3, lines 2, 21, 27, and 44, please delete "take up" and insert therefor --take-up--

In column 3, line 4, after the word "ready-run", please insert the word --position--

In column 3, lines 11 and 12, please delete "ready-run position" and insert therefor --"ready-run" position--

UNITED STATES PATENT AND TRADEMARK OFFICE
CERTIFICATE OF CORRECTION

PATENT NO. : 5,234,179
DATED : August 10, 1993
INVENTOR(S) : James E. Skavnak et al.

It is certified that error appears in the above-indentified patent and that said Letters Patent is hereby corrected as shown below:

In column 4, lines 10, 40, 55, 56, 62, 63, and 65, please delete "take up" and insert therefor --take-up--

In column 4, line 1, after the words "ready-run", please insert the word --position--

In column 4, line 34, after the word "attached", please insert the word --to--

In column 4, line 63, after the words "bonded to the", please delete the word "hub"

In column 6, line 50, after the words "take-up reel", please delete the word "of" and insert therefor --or--

Signed and Sealed this

Thirty-first Day of May, 1994

BRUCE LEHMAN

Attest:

Attesting Officer

Commissioner of Patents and Trademarks